United States Patent [19]

Taube et al.

[11] 4,062,220
[45] Dec. 13, 1977

[54] FLUID MEASURING AND METERING SYSTEM

[75] Inventors: Frank Taube, Southfield; Lawrence Lawson, Troy, both of Mich.

[73] Assignee: Dominion Tool & Die Co., Inc., Roseville, Mich.

[21] Appl. No.: 704,015

[22] Filed: July 9, 1976

[51] Int. Cl.² .............................................. G01F 25/00
[52] U.S. Cl. ............................................................ 73/3
[58] Field of Search .................. 222/57, 145, 70, 318; 73/3, 205 R

[56] References Cited

U.S. PATENT DOCUMENTS

| | | | |
|---|---|---|---|
| 2,057,767 | 10/1936 | Collins | 73/205 R |
| 2,211,753 | 8/1940 | Leopold | 222/57 X |
| 2,991,645 | 7/1961 | Lauderdale | 73/3 |
| 3,021,703 | 2/1962 | Pfrehm | 73/3 |
| 3,252,618 | 5/1966 | Anderson et al. | 73/3 X |
| 3,306,495 | 2/1967 | Wabers | 222/318 X |
| 3,939,688 | 2/1976 | Misch et al. | 73/3 |

*Primary Examiner*—Allen N. Knowles
*Assistant Examiner*—Hadd Lane
*Attorney, Agent, or Firm*—Harness, Dickey & Pierce

[57] ABSTRACT

A system for accurately mixing two or more liquids and for dispensing the mixture. The system is generally adapted for use in paint spraying operations. The flow of one of the components is accurately measured by means of a flow meter and the measured value provides a signal to control a valve which, in turn, controls the flow of the other liquid. Periodically the volume of the first mentioned liquid is measured for a given time period so as to make necessary adjustments in the flow meter-valve interconnection. An improved arrangement is provided for purging a mixing manifold immediately prior to the completion of the dispensing cycle so that none of the mixture will be wasted. The control arrangement includes improved air operated two and three-way valves.

8 Claims, 3 Drawing Figures

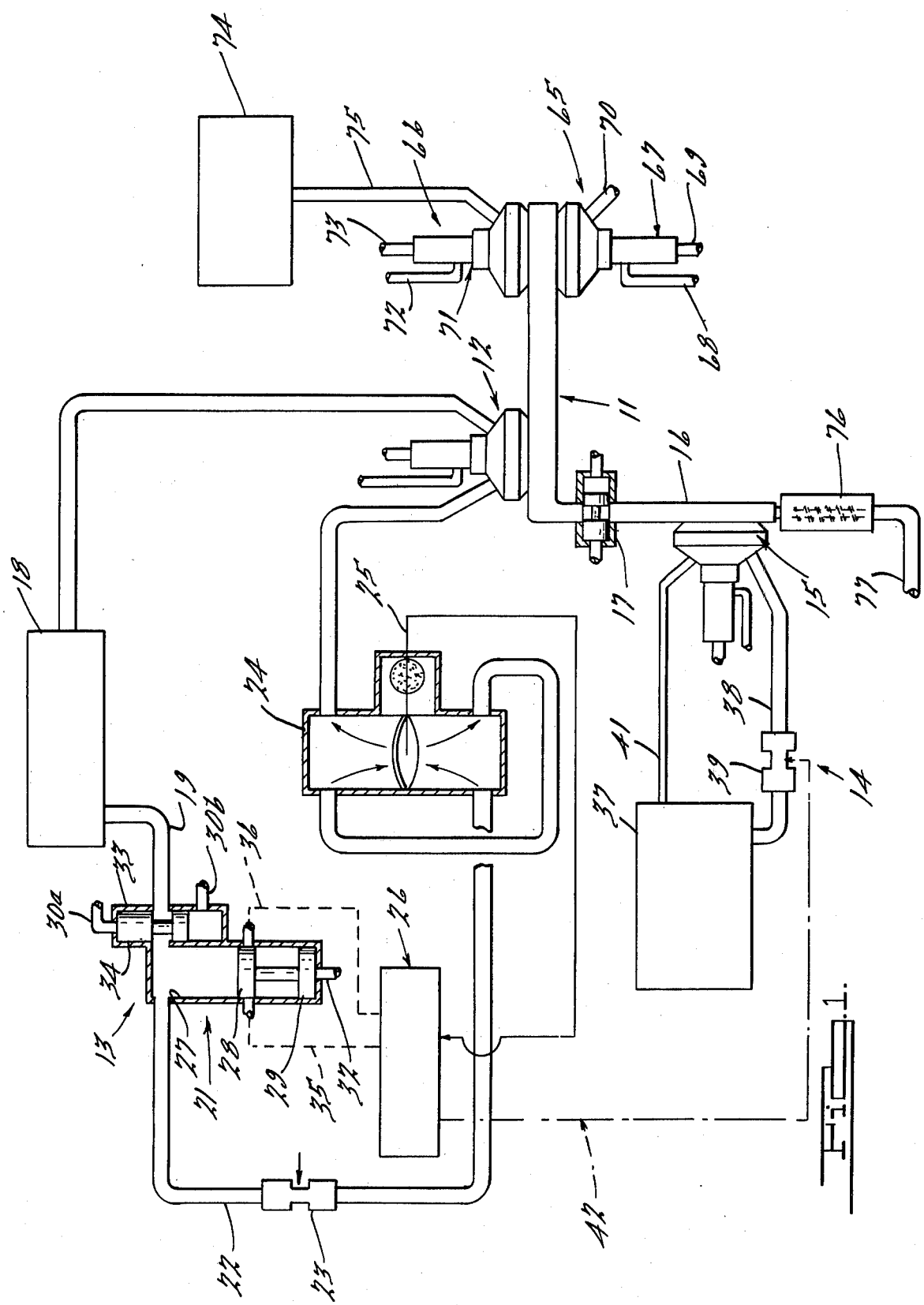

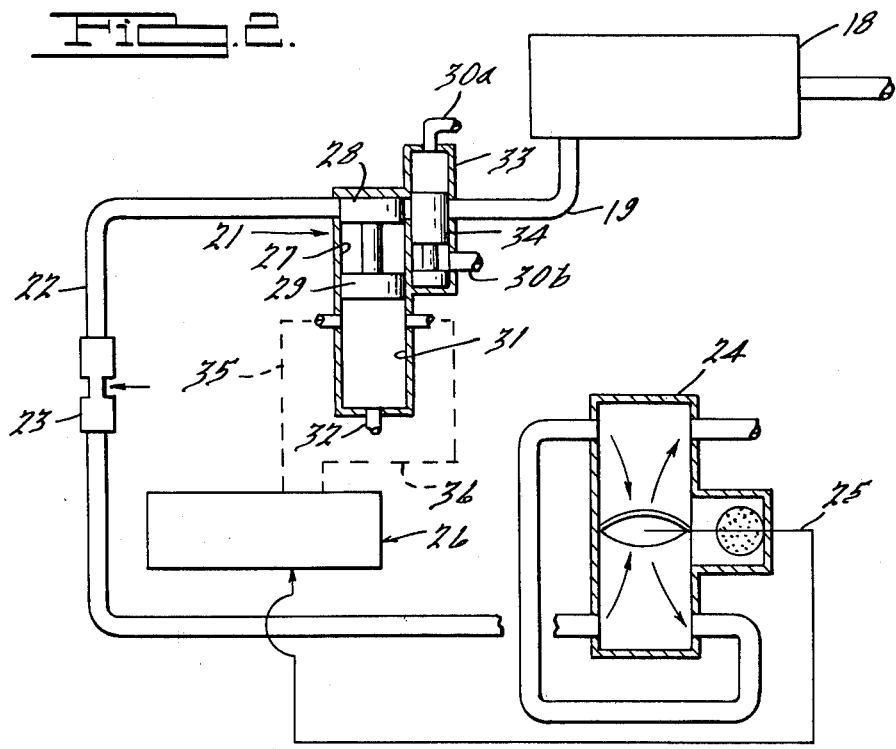
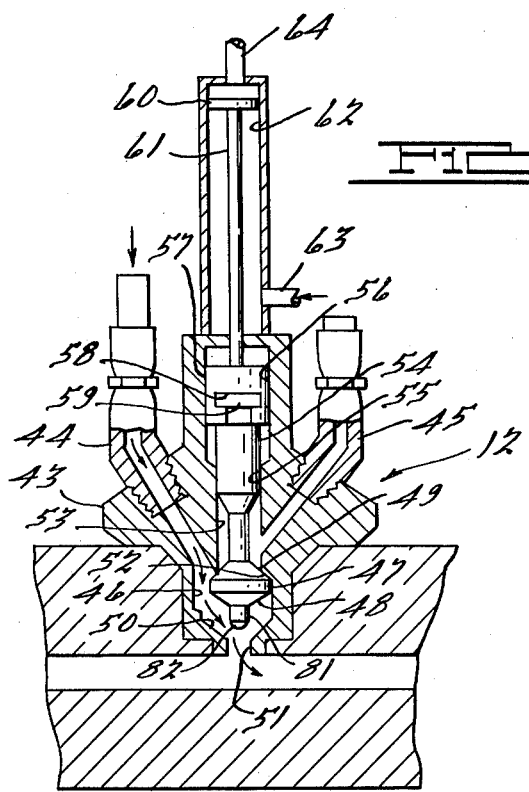

FLUID MEASURING AND METERING SYSTEM

BACKGROUND OF THE INVENTION

This invention relates to a system for metering the flow of fluid in a conduit and more particularly to a system for providing an accurate flow rate regardless of the specific gravity, temperature and/or viscosity of the fluid flowing.

Various devices have been provided for measuring fluid flow rates. These devices sense in some manner the motion of the fluid through the conduit and provide an indication of flow rate. Such devices may comprise dynamic measuring devices and/or devices responsive to pressure drop in a given length of conduit. Although such devices offer extreme accuracy at given pressure temperature and viscosity conditions, changes in any of the aforenoted variables will alter the accuracy of the measuring system.

It is, therefore, a principal object of this invention to provide an improved system for measuring flow of a fluid in a conduit.

It is another object of the invention to provide a flow measuring system that provides an extremely accurate readout regardless of variables.

SUMMARY OF THE INVENTION

This invention is adapted to be embodied in a system for metering the flow of fluid in a conduit. The system includes a dynamic flow measuring device for measuring the rate of flow of fluid in the conduit and means for selectively measuring the volume of fluid flowing through the conduit in a predetermined time interval. Means are also provided for comparing the two measured values to afford accurate correction of the out-put signal.

BRIEF DESCRIPTION OF THE DRAWINGS

FIG. 1 is a partially schematic, partially cross-sectional view of a fluid mixing and dispensing system embodying this invention.

FIG. 2 is a view, in part similar to FIG. 1, showing certain components of the system in another mode of operation.

FIG. 3 is an enlarged cross-sectional view of one of the valves used in the system.

DETAILED DESCRIPTION OF THE PREFERRED EMBODIMENTS

FIG. 1 illustrates, in part schematically, a fluid mixing and dispensing system embodying the invention. The system is particularly adapted for mixing and dispensing paints. It should be understood, however, that other applications for the invention will present themselves to those skilled in the art. The disclosed system is particularly adapted for use in production lines where a plurality of different colors may be sprayed. In order to establish the color mixing or blending of the painting materials, individual pigment mixtures are combined with a common constituent. It should be readily apparent that the exact ratio of the mixture components must be accurately controlled so as to insure uniformity in paint mixture. The described apparatus is particularly adapted for achieving this result.

Referring now to the drawings, the element 11 indicates generally a manifold that is adapted to receive the optional mixture components, each of which is supplied by a respective three-way valve, one of which is indicated generally by the reference numeral 12. It is to be understood that there will be any suitable number of such three-way valves depending upon the number of optional mixture components to be employed. For the sake of illustration, only one such three-way valve 12 and one optional component system, indicated generally by the reference numeral 13 have been illustrated. A common component system, indicated generally by the reference numeral 14 supplies a common component by means of a three-way valve 15 to the discharge conduit 16 of the manifold 11. A main shut-off valve 17 controls the flow between the manifold 11 and conduit 16, as will become apparent.

Referring now to the optional component system 13, this system includes an optional component reservoir 18 in which the optional component is stored. In the described embodiment, the reservoir 18 may hold the paint mixture of predetermined pigment. The reservoir 18 discharges through a conduit 19 into a fluid displacement sampler, indicated generally by the reference numeral 21. As will become more apparent as this description proceeds, the sampler 21 is intended to periodically determine the exact flow rate of the components fed from the reservoir 18 and to provide a corrective signal that will correct for variations in flow rate caused by changes in specific gravity, temperature and/or viscosity.

A conduit 22 provides the discharge from the fluid displacement sampler 21. A flow control valve 23 is provided for controlling the flow of the optional mixture component. The valve 23 may be positioned in the conduit 22, as illustrated, or in the return conduit connecting the valve 12 with the reservoir 18. A differential transducer 24 is positioned in the conduit 22 and functions to provide a continuous signal of the rate of flow of the optional component from the reservoir 18. The differential transducer 24 measures the pressure drop across a finite length flow loop provided within the transducer 24 and, in turn, gives an out-put signal via a conductor 25 that is indicative of the flow rate. Since the transducer 24 is responsive to pressure drop, the indicated flow rate will vary with specific gravity and temperature. Said another way, the signal provided with the conductor 25, if correct at a given temperature, specific gravity, and viscosity, will have to be modified or corrected if the temperature, specific gravity and/or viscosity change. The fluid displacement sampler 21 provides the necessary updating information to correct this data, as will be described. The out-put signal from the conduit 25 is delivered to a monitoring computer indicated generally by the reference numeral 26.

The fluid displacement sampler 21 also provides a signal to the monitoring computer 26 so as to update the data provided by the differential tranducer 24 as will now be described, by particular reference to FIGS. 1 and 2. The fluid displacement sampler 21 includes a cylinder 27 of predetermined finite volume. A piston 28 is slidably supported in the cylinder 27 and is movable from a maximum volume position (FIG. 1) to a minimum volume position (FIG. 2). A separate piston head 29 is integrally connected to the piston 28 and cooperates with an air chamber 31 formed below the piston head 29 that may be pressurized by a suitable air source via the conduit 32 to urge the piston 28 from the position shown in FIG. 1 to the position shown in FIG. 2.

The portion of the cylinder 27 above the piston 28 receives the optional mixture components from the reservoir 18 and conduit 19 via an air operated valve 33.

The valve 33 includes a spool 34 that is movable between an opened position (FIG. 1) and a closed position (FIG. 2).

In order to effect the correction of the monitoring computer 26 a predetermined volume of fluid is charged into the chamber 27. This occurs due to the pressure in the conduits 19 and 22 when the valve spool 34 is in its opened position. This pressure in the conduits urges the piston 28 downwardly to the position shown in FIG. 1. When sampling is to be effected, the valve spool 34 is moved to its closed position, (FIG. 2) by appropriately pressurizing the upper side of this valve through a conduit 30a. This cuts off communication between the reservoir 18 and conduit 22. Simultaneously, the piston head 29 is pressurized by admitting air under pressure at a predetermined value through the conduit 32. This drives the piston 28 upwardly to displace the volume of optional mixture components trapped in the cylinder 27.

The position of the piston 28 is sensed by optical sensors (not shown) and provides a signal to the monitoring computer 26 by conductors 35 and 36. The time required by the piston 28 to move between the two positions and displace the predetermined volume of optional mixture component from the cylinder 27 will provide an accurate indication of the flow rate of this fluid. Said another way, the time which it takes to displace this fluid will be related to viscosity, temperature and specific gravity. This data is then fed into the computer 26 to correct the signal received from the differential transducer 24 by the conductor 25.

After sampling, the cylinder 27 is recharged by returning the valve spool 34 to its opened (FIG. 1) position. This is accomplished by venting conduit 30a and pressurizing a conduit 30b that enters the valve chamber below the spool 34.

This corrected signal is used to control the flow from the common component system 14, as will now be described. The system 14 includes a reservoir 37 in which the common mixture component is stored. This component is conveyed via a conduit 38 in which a binary flow control valve 39 is positioned, to the three-way valve 15. A return path 41 is provided from the three-way valve 15 to the reservoir 37 so that the common mixture component contained in the reservoir 37 is continuously flowing. The binary flow control valve 39 is controlled by the monitoring computer 26 as schematically indicated by the broken line 42 so as to maintain the desired ratio of flow between the mixtures in the reservoirs 18 and 37.

The construction of the three-way valves 12 and 15 and their operation will be described by reference to FIG. 3, wherein the valve 12 is shown in detail. It is to be understood that the construction of the valves 12 and 15 is identical. The valve 12 is comprised of a main valve body 43 formed with an inlet conduit 44 and a return conduit 45. The conduit 44 extends into a valve chamber 46 in which a movable valve member 47 is positioned. The valve member 47 has a pair of opposed valving surfaces 48 and 49. The surface 48 cooperates with a valve seat 50 to control the flow through a discharge conduit 51. The valve member 47 has a cylindrical projection 81 extending from the seat 48. In the new, unworn condition the projection 81 has the same length as the discharge conduit 51. Thus no fluid can be trapped in the end of the conduit 51 when the valve 47 is in its closed position. This also facilitates purging of the manifold 11. If wear occurs, the projection 81 will extend slightly into the passage of the manifold 11 when the valve 47 is closed. If desired the projection 81 may have a spherical end 82 that extends slightly into the manifold passage. This will induce some slight turbulance to the flow through the manifold 11. The valve surface 49 cooperates with a valve seat 52 to control communication with a return chamber 53 that is intersected by the return conduit 45.

The valve member 47 has an operating spool portion 54 that is slidably supported in a bore 55, which is an extension of the return chamber 53. The bore 55 terminates in an enlarged counterbore 56. An operating member 57 is slidably supported in the counterbore 56 and has a groove 58 that receives a tongue 59 on the valve portion 54 to couple the valve operating member 57 to the valve 47.

The valve operating member 57 is connected to a piston 60 by a piston rod 61. The piston 60 is slidably supported in a chamber 62. An air conduit 63 communicates with the chamber 62 below the piston 60. A second air conduit 64 communicates with the chamber 62 on the upper side of the piston 60.

FIG. 3 illustrates the three-way valve in the discharge position. In this position, the chamber 62 is pressurized by the conduit 63 and the conduit 64 is vented to atmosphere. The air pressure acts on the lower side of the piston 60 and urges it and the valve 47 upwardly. The valve surface 49 contacts the seat 52 and closes off the return passage 45. Flow is then permitted from the inlet passage 44 through the valve chamber 46 past the valve seat 50 and out the discharge opening 51. To cut off discharge, the conduit 63 is vented to atmosphere and the conduit 64 is pressurized. The pressure then acts on the upper side of the piston 60 to drive it and the valve 47 downwardly. The valve surface 48 then contacts the seat 50 and closes off communication with the discharge passage 51 and the projection 81 forces any remaining fluid from the passage 51. At the same time, the valve surface 40 moves away from the valve seat 52 and opens communication with the return passage 45.

Also communicating with the interior of the manifold 11 is a soft air system for purging the manifold of mixture components, indicated generally by the reference numeral 65 and a solvent flushing system, indicated generally by the reference numeral 66. The purging system 65 is comprised of a two-way valve, indicated generally by the reference numeral 67. The two-way valve 67 is operated between an opened and closed position by means of air conduits 68 and 69 respectively. The two-way valve 67 is substantially the same in construction as the three-way valve 12 which was previously described. With this valve, however, no return conduit is provided. The valve 67 functions purely as an on/off valve to control air from a pressure source of predetermined value through a conduit 70.

The flushing system 66 also includes a two-way valve, indicated generally by the reference numeral 71. The two-way valve 71 is operated between an opened and a closed position by means of air conduits 72 and 73 respectively. The two-way valve 71 controls the flow of solvent from a reservoir 74 through a conduit 75 into the manifold 11.

OPERATION

FIG. 1 illustrates the system in the condition prior to spray painting. In this condition, the optional mixture components from the respective reservoirs 18 and continuously circulated through the open valve 33, differential pressure flow transducer 24 and three-way valves 12, which are in their return flow condition. The differential flow transducer 24 will provide a continuous signal to the monitoring computer 26 of the flow rate of the optional mixture component from the reservoir 18. If the flow rate is outside of predetermined limits, the computer 26 may be programmed to provide a signal to this effect.

The common mixture component from the reservoir 37 is recirculated through the three-way valve 15 that is in its return flow mode. At this time, the binary control valve 39 is maintained in a full opened position. The solvent flushing system 66 will be closed as will the soft air purging system 65. The fluid displacement sampler 21 will be operated periodically to update the signals to the monitoring computer 26, in the manner previously described.

When paint discharge is required, the operator sets the desired color, thus conditioning the proper optional component reservoir 18 for discharge. At this time, the signal from the monitoring computer 26 will set the binary control valve 39 to the appropriate position to establish the desired mixture ratio. When a specific optional component reservoir 18 is selected for delivery, the automatic cycling of the fluid displacement sampler 21 is disabled so that the flow from this component will not be affected during discharge. Immediately prior to opening of the valves 12, 15 and 17 the interior of the manifold 11 is evacuated by means of a vacuum pump or the like. This insures that the manifold 11 will be completely charged with the selected optional mixture component when the selected valve 12 is opened. If this were not done, an uneven initial flow might occur due to the different locations of the respective valves 12 along the length of the manifold 11.

When discharge is desired, the three-way valves 12 and 15 are cycled from their return to their discharge positions. At the same time, the shut-off valve 17 will be opened. The components are then discharged into a mixer 76 for discharge from a conduit 77 into a spray gun (not shown).

Immediately prior to the completion of spraying, as set by a timer or an external signal, the three-way valve 12 will be returned to its return position cutting off communication between the reservoir 18 and the manifold 11. A finite volume of fluid will be trapped in the manifold 11, the volume being chosen to be sufficient to complete the spraying operation. The soft air purging system 65 is then actuated to purge the trapped components from the manifold 11. This is done by opening the valve 67 and permitting air under a predetermined pressure to enter the manifold 11 from the conduit 70. The purging air is admitted at a pressure that is equal to the pressure which existed in the manifold 11 immediately prior to closure of the valve 12. It should be understood that each of the optical mixture components may be circulated at a different pressure. This will purge the remaining optional mixture components from the manifold 11.

Once spraying is completed, the manifold 11 is cleaned by the solvent system 66 and the air system 65 which are pulsed intermittently. Alternately, the valve 71 is opened to permit flow of solvent from the reservoir 74 through the conduit 75 into the manifold 11 and air is forced through the manifold. The solvent is flushed through the manifold 11, conduit 16, mixer 76 and out the spray gun. At this time, the three-way valve 15 is also placed in the return condition. After a predetermined amount of alternate air and solvent pulsing, the manifold 11 is dried by closing of the solvent valve 71 and reopening of the air valve 67. The air pressure during the cleaning cycle is much higher than during the purging cycle. This completes the cycle and places the system in operation for the next discharge.

It is to be understood that the foregoing description is that of a preferred embodiment of the invention. Various changes and modifications may be made without departing from the spirit and scope of the invention as defined by the appended claims.

We claim:

1. A system for measuring the flow of fluid in a conduit of a system comprising a dynamic flow measuring device in fluid communication with said conduit for measuring the rate of flow of the fluid in the conduit, volume measuring means for measuring the volume of fluid, valve means for selectively diverting at least a portion of the fluid flowing through the conduit into the volume measuring means and for returning the diverted fluid from the volume measuring means to the conduit for measuring the volume of fluid flowing through the conduit in a predetermined time interval, and means for comparing the two measured values.

2. A system as set forth in claim 1 wherein the valve means for diverting the portion of the fluid flowing in the conduit into the volume measuring means is operated at predetermined time intervals with dwell periods between such measuring.

3. A system as set forth in claim 1 wherein the means for comparing the two measured values comprises means for providing an out-put signal responsive to the signal of the dynamic flow measuring device and means for altering said out-put signal dependent upon the signal received from the volume measuring device.

4. A system as set forth in claim 3 wherein the means for measuring the volume of fluid is operated at predetermined time intervals with dwell periods between such measuring.

5. A system as set forth in claim 3 wherein the dynamic flow measuring device comprises a differential pressure measuring device to provide a signal responsive to the pressure loss along the predetermined length of the conduit.

6. A system as set forth in claim 1 wherein the means for measuring the volume of fluid flowing through the conduit in a predetermined time interval comprises means defining a chamber of finite volume, a displaceable wall in said chamber movable between a first position and a second position, said wall cooperating with said chamber upon movement between its two positions to displace a volume of predetermined amount, the valve means being adapted to selectively admit fluid into said chamber and discharge fluid from said chamber into and out of said conduit upon relative movement of said wall, and timer means for timing the interval required by said wall to move between said positions.

7. A system as set forth in claim 6 wherein the dynamic flow measuring device comprises a differential pressure measuring device to provide a signal responsive to the pressure loss along the predetermined length of the conduit.

8. A system as set forth in claim 7 wherein the means for measuring the volume of fluid is operated at predetermined time intervals with dwell periods between such measuring.

* * * * *